US009674055B2

(12) United States Patent
Letca et al.

(10) Patent No.: US 9,674,055 B2
(45) Date of Patent: Jun. 6, 2017

(54) MONITORING FEDERATION FOR CLOUD BASED SERVICES AND APPLICATIONS

(71) Applicant: Microsoft Technology Licensing, LLC, Redmond, WA (US)

(72) Inventors: Ilarie Letca, Redmond, WA (US); Ashvinkumar J. Sanghvi, Sammamish, WA (US); Brijesh D. Bhatia, Redmond, WA (US); Ferit Findik, Seattle, WA (US); Vitaly Voloshin, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/280,263

(22) Filed: May 16, 2014

(65) Prior Publication Data
US 2014/0258513 A1 Sep. 11, 2014

Related U.S. Application Data

(62) Division of application No. 12/651,482, filed on Jan. 4, 2010, now Pat. No. 8,745,397.

(51) Int. Cl.
*H04L 29/06* (2006.01)
*H04L 12/26* (2006.01)
(Continued)

(52) U.S. Cl.
CPC .......... *H04L 43/04* (2013.01); *G06F 21/6218* (2013.01); *H04L 41/28* (2013.01);
(Continued)

(58) Field of Classification Search
CPC .................................................... H04L 12/581
(Continued)

(56) References Cited

U.S. PATENT DOCUMENTS 7,007,089 B2 2/2006 Freedman
7,587,450 B2 9/2009 Morris
(Continued)

FOREIGN PATENT DOCUMENTS

CN 1829162 A 9/2006
CN 101257377 A 9/2008
JP 2004-021873 A 1/2004

OTHER PUBLICATIONS

International Search Report dated Aug. 30, 2011 in International Application No. PCT/US10/062650.
(Continued)

*Primary Examiner* — Jason K Gee
(74) *Attorney, Agent, or Firm* — Lee & Hayes, PLLC

(57) ABSTRACT

Technologies are described herein for cloud monitoring federations that can include cloud monitoring services (CMS) that collect monitoring information from point of presence (POP) agents. The cloud monitoring POPs may be located in the cloud, on client machines, embedded within cloud applications, or wherever they can obtain visibility into managed entities associated with the cloud. Management systems, acting as cloud monitoring clients (CMC), may interface with the CMS to obtain a complete view of services and application used by their enterprise including those that operate outside of the enterprise premises as part of a cloud or outside network. The publishing by POPs and consumption by CMCs of management information across components within the enterprise and out in the cloud may be supported by managing roles, responsibilities, scopes, security boundaries, authenticity of information, service level agreements, and other aspects of cloud monitoring operations.

20 Claims, 6 Drawing Sheets

(51) Int. Cl.
*G06F 21/62* (2013.01)
*H04L 12/24* (2006.01)
*H04L 29/08* (2006.01)

(52) U.S. Cl.
CPC .............. *H04L 63/10* (2013.01); *H04L 67/10* (2013.01); *H04L 67/22* (2013.01)

(58) Field of Classification Search
USPC ....................................................... 709/224
See application file for complete search history.

(56) References Cited

U.S. PATENT DOCUMENTS

| | | | |
|---|---|---|---|
| 2003/0009540 | A1 | 1/2003 | Benfield et al. |
| 2005/0100015 | A1 | 5/2005 | Eubanks |
| 2005/0108371 | A1 | 5/2005 | Manion et al. |
| 2005/0108383 | A1* | 5/2005 | DeHaas et al. ............... 709/224 |
| 2008/0010631 | A1 | 1/2008 | Harvey et al. |
| 2008/0306958 | A1 | 12/2008 | Sreedhar |
| 2009/0178132 | A1* | 7/2009 | Hudis ............... G06F 17/30867 726/12 |
| 2009/0300149 | A1 | 12/2009 | Ferris et al. |
| 2009/0300635 | A1* | 12/2009 | Ferris ..................... G06Q 30/02 718/104 |
| 2010/0214090 | A1* | 8/2010 | Sartini .................. H04L 12/581 340/517 |
| 2011/0131499 | A1 | 6/2011 | Ferris et al. |

OTHER PUBLICATIONS

"Monitis Cloud Monitor launched for Monitoring the Cloud", Published on: May 17, 2009, Available at: http://www.top10dedicatedhosting.com/en/?p=982, 4 Pages.

"Enterprise Monitoring and Management for Cloud Services", Published on: Oct. 10, 2009, Available at: http://www.hyperic.com/products/cloud-monitoring.html, 2 Pages.

"RightNow Cloud Monitor Flash Demo", Published on: Oct. 10, 2009, Available at: http://www.rightnow.com/resource-demo-cloud-monitor.php, 2 Pages.

U.S. Official Action dated Aug. 22, 2012 in U.S. Appl. No. 12/651,482.

U.S. Official Action dated Dec. 3, 2012 in U.S. Appl. No. 12/651,482.

U.S. Official Action dated Sep. 17, 2013 in U.S. Appl. No. 12/651,482.

U.S. Notice of Allowance dated Jan. 24, 2014 in U.S. Appl. No. 12/651,482.

"Amazon CloudWatch How it works," Published Apr. 22, 2014, Available at: http://www.praesentia.co.jp/business/tapinsystems/how-it-works/amazon-cloudwatch/, 7pages.

The Chinese Office Action mailed Jan. 16, 2015 for Chinese application No. 201080060292.8, a counterpart foreign application of U.S. Appl. No. 12/651,482, 6 pages.

The Chinese Office Action mailed May 21, 2014 for Chinese application No. 201080060292.8, a counterpart foreign application of U.S. Appl. No. 12/651,482, 14 pages.

The European Search Report mailed Oct. 1, 2014 for European application No. 10841784.1, a counterpart foreign application of U.S. Appl. No. 12/651,482, 7 pages.

The Japanese Office Action mailed Apr. 30, 2014 for Japanese application No. 2012-5480458, a counterpart foreign application of U.S. Appl. No. 12/651,482, 7 pages.

Legrand et al., "MonALISA: An agent based, dynamic service system to monitor, control and optimize distributed systems," Computer Physics Communication, vol. 180, No. 12, Apr. 1, 2009, pp. 2472-2498.

Ricknas et al., "Tap In Systems monitors and runs in teh cloud," Published On: Apr. 21, 2009, Available at: http://www.pcworld.com/article/163534/article.html, 3 pages.

Windows Azure Seen From Networks, vol. 114, Nikkei BP Publications Inc., Sep. 28, 2009, pp. 62-65.

* cited by examiner

MONITORING FEDERATION FOR CLOUD BASED SERVICES AND APPLICATIONS

CROSS-REFERENCE TO RELATED APPLICATIONS

This application is a divisional of co-pending U.S. patent application Ser. No. 12/651,482 filed on Jan. 4, 2010, and entitled "Monitoring Federation for Cloud Based Services and Applications," which is expressly incorporated herein by reference in its entirety.

BACKGROUND

Management systems, such as those used in information technology (IT) operations, can track various services and applications. Traditionally these services and applications are located and operated within the physical premises of the enterprise. With the increasing deployment of cloud based services, web based applications, software as a service, service oriented architectures, and so forth, the locations of services and applications are crossing physical, jurisdictional, and security boundaries.

Traditional IT management systems are generally not equipped to provide visibility into, or control of, services and applications that reside outside the jurisdiction of the enterprise IT operation. Traditional applications and services do not adapt to the health of other cloud components even though such information could support decision making to improve customer experiences or reduce costs. Also, traditional IT management systems cannot provide a complete view of service quality from inside and from outside an organization. This limitation is particularly present where related applications or services are hosted in a cloud, or are hosted internally and in a cloud simultaneously.

It is with respect to these and other considerations that the disclosure made herein is presented.

SUMMARY

Technologies are described herein for cloud monitoring federations that can include cloud monitoring services (CMS) that collect monitoring information from point of presence (POP) agents. The cloud monitoring POPs may be located in the cloud, on client machines, embedded within cloud applications, or wherever they can obtain visibility into managed entities associated with the cloud. As used herein, the cloud may refer to a network environment for providing abstracted access to services, applications, and data located within the network. Through the utilization of the technologies and concepts presented herein, management systems, acting as cloud monitoring clients (CMC), may interface with the CMS to obtain a complete view of services and applications used by their enterprise including those that operate outside of the enterprise premises as part of a cloud or outside network. The publishing by POPs and consumption by CMCs of management information across components within the enterprise and out in the cloud may be supported by managing roles, responsibilities, scopes, security boundaries, authenticity of information, service level agreements, and other aspects of cloud monitoring operations.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
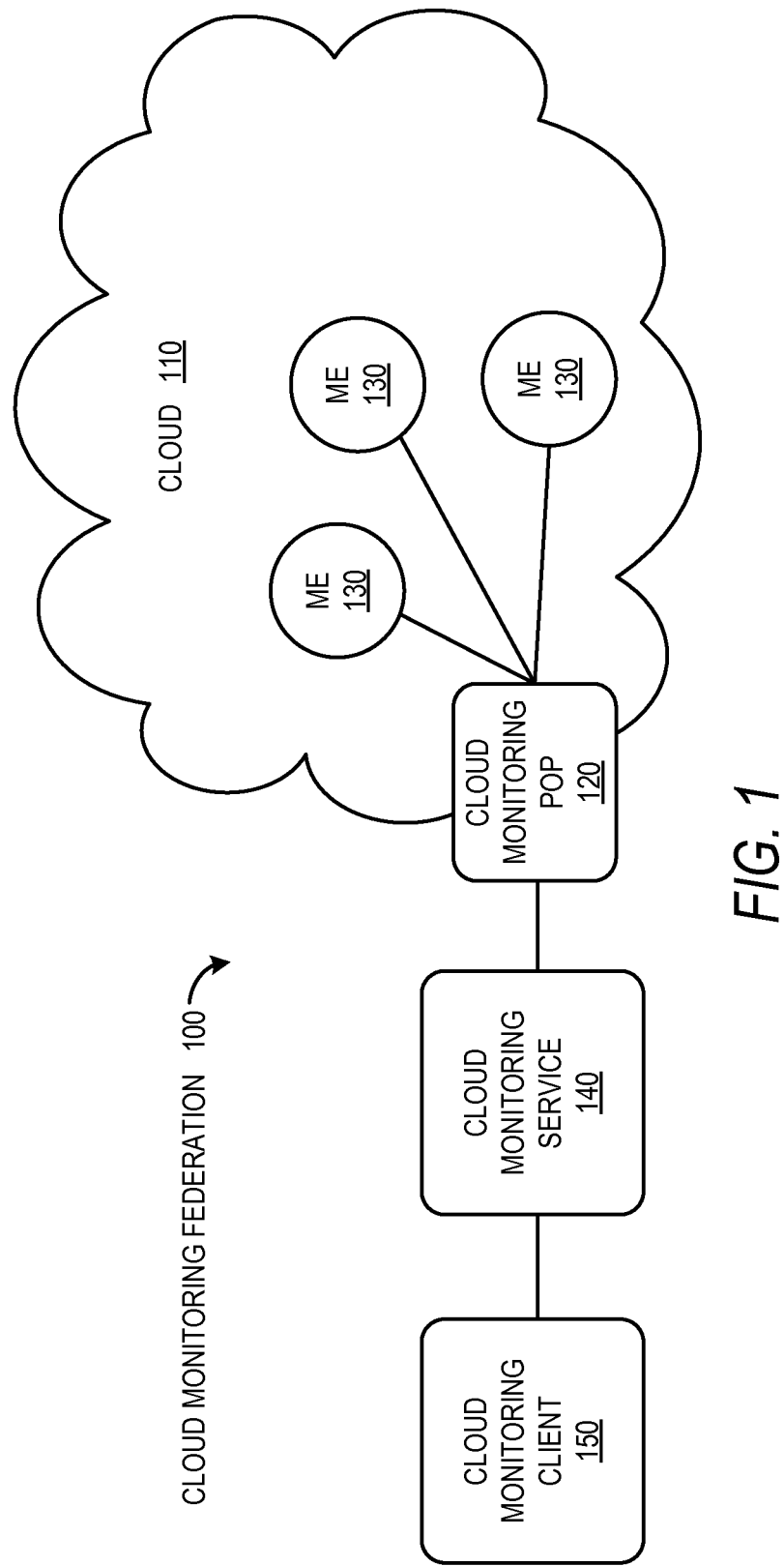
FIG. 1 is a block diagram illustrating a cloud monitoring federation according to one or more embodiments presented herein.

The following detailed description is directed to technologies for cloud based service and application monitoring. Through the utilization of the technologies and concepts presented herein, cloud monitoring clients can interface with a cloud monitoring service to obtain a complete view of services and applications used within an enterprise, including those that operate outside of the enterprise premises as part of a cloud or outside network. As mentioned briefly above, a cloud a network environment for providing abstracted access to services, applications, and data located within the network.

Examples of cloud based services may include service oriented architectures (SOA) where entire service components may be owned and operated by outside organizations. Other examples may include hosted cloud services where a complete or partial service may be hosted on an enterprise or third party hosting service. The hosting service may host a virtual machine or application components. Other examples may provide a platform of cloud services for enterprise service use. For example, a passport authentication service, a credit card validation system, or a cloud database system may be used as cloud services by other enterprise services. Other examples may include software as a service (SaaS) such as applications that enterprise end users may access via a network or the World Wide Web.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, concepts and technologies for cloud based service and application monitoring will be described.

Turning now to FIG. 1, a block diagram illustrates a cloud monitoring federation (CMF) 100 according to one or more embodiments presented herein. The CMF 100 is a federation formed between various networked entities to support cloud based service and application monitoring. The CMF 100 may include a cloud monitoring service (CMS) 140. The CMS 140 can serve as a central subscription and publication service. The CMS 140 can collect information monitored by a cloud monitoring point of presence (POP) 120. The POP 120 can monitor and aggregate information published from one or more managed entities (MEs) 130 within a cloud 110. A cloud monitoring client (CMC) 150 can subscribe to the CMS 140 to consume published management information related to the MEs 130.

The CMS 140 is a cloud based distributed service that acts as a centralized and dynamic repository of management information related to MEs 130. The MEs 130 may be services or applications distributed within the cloud 110. The management information may include health metrics, performance metrics, and various other statistics associated with the MEs 130.

The CMS 140 can register customers as CMCs 150, POPs 120, or both. Registration can unite the CMS 140, CMCs 150, and POPs 120 to form the CMF 100. Publication and subscription protocols may support the POP 120 to publish monitored information to the CMS 140. Similarly, the protocols may support subscribing by the CMC 150 to the CMS 140 to receive the monitored information. Negotiation protocols may be used to determine which POPs 120 may publish what pieces of information into the CMS 140 and also which CMCs 150 may access which pieces of information from the CMS 140. These protocols may also support the discovery of other actors present on a network such as CMSs 140, CMCs 150, and POPs 120. The registration processes can provide security within the CMF 100 to protect against unauthorized or invalid publishing of information by POPs 120 or undesired access to information by CMCs 150.

The CMS 140 may provide the POP 120 with role and scope based update rights. Such rights may define roles and scopes for the POP 120 as to which MEs 130 it may report on. The roles and scopes may also include details such as how frequently the reporting should occur, at what level of detail, and to where it should be published. The CMS 140 may also provide role and scope based access rights to the CMC 150 to define which ME 130 related information may be accessed or subscribed to.

Elements within the CMF 100, such as POPs 120, MEs 130, CMSs 140, and CMCs 150 may be uniquely identified from one another using any type of unique identification tokens. Unique identification of each element may be useful in defining roles, scopes, or other parameters associated with the elements. According to some embodiments, a representational state transfer (REST) model may be used. For example, actors within the CMF 100 may be identified by uniform resource identifiers (URIs).

The POP 120 and the CMS 140 can each maintain models for the MEs 130 that the POP 120 utilizes to report information on to the CMS 140. These models may include relationships between the MEs 130 and may be classified by types of instances. For example a specific desktop computer may be an instance of the type "computer." Using common models of a format understood by multiple actors in the CMF 100 can support simplified transfer and aggregation of monitored information. The CMS 140 can receive, aggregate and update metrics, statistics, health, and other information related to MEs 130 as published by the associated POPs 120. The CMS 140 can manage redundancy of information that may accrue due to multiple points of view on a ME 130. For example, the CMS 140 can monitor and manage the scopes provided to POPs 120 to reduce the redundant points of view.

The CMS 140 can respond to queries or subscription requests from CMCs 150 seeking to access monitored information at the CMS 140. The CMS 140 may support a query language for receiving queries from CMCs 150. For example, a query language based on an extensible markup language (XML), such as object constraint language (OCL), may be used. The CMS 140 can manage the throttling of information published from the POPs 120. For example, the CMS 140 may request a POP 120 to slow down, or halt, publication. Also, the CMS 140 may gate individual POP 120 functionality on and off based on the interest levels of subscribing CMCs 150.

A CMCs 150 can negotiate a monitoring policy with a CMS 140. The monitoring policy may include one or more of a monitoring frequency, a number of POPs 120 to monitor, a location of a POP 120 to monitor, and a filtering specification.

An ME 130 may be any service or a component of a service under management. According to some embodiments, the ME 130 may not be an active participant in the CMF 100. Instead, the ME 130 may be an instance within the managed world that can be discovered and related to other instances or MEs 130. Metrics, statistics, health status, and other information about the MEs 130 may be posted to, or queried from, the CMS 140. According to some other embodiments, the ME 130 may participate as a POP 120 and publish information related to internal or dependent components. It should be appreciated that the aggregation and caching of monitored information may occur at a POP 120, a CMS 140, a CMC 150, or any combination thereof.

Figure 2:
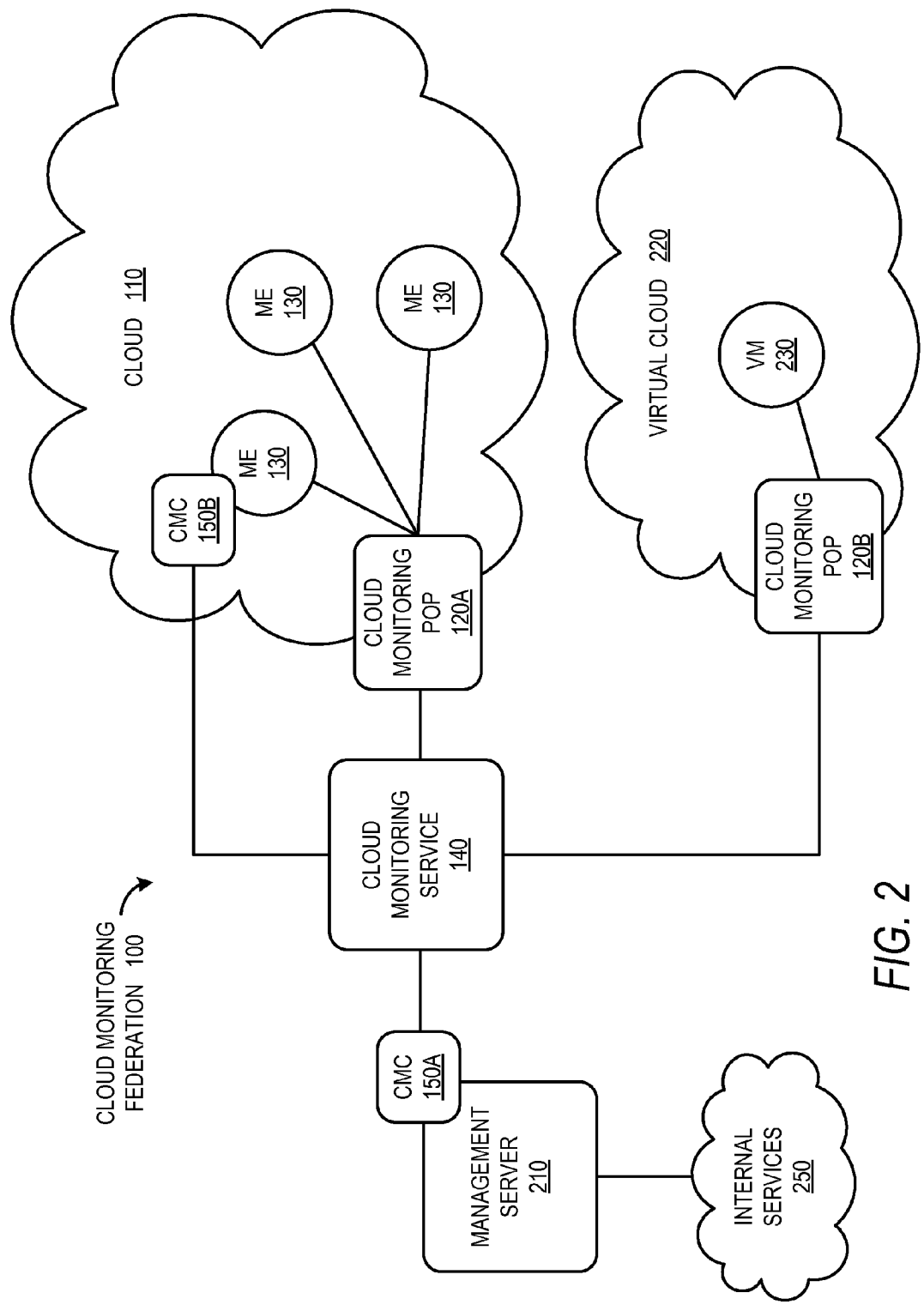
FIG. 2 is a schematic diagram illustrating additional detail regarding a cloud monitoring federation according to one or more embodiments presented herein.

Turning now to FIG. 2, a block diagram illustrates additional detail regarding a cloud monitoring federation (CMF) 100 according to one or more embodiments presented herein. The CMF 100 may include a cloud monitoring service (CMS) 140 serving as a central subscription and publication service. The CMS 140 can collect information on MEs 130 within a cloud 110 that are monitored by a POP 120A. The CMS 140 can also collect information on a virtual machine (VM) 230 within a virtual cloud 220 that is monitored by a POP 120B.

A CMC 150A may be associated with a management server 210 to support subscription and querying activities from the management server 210 into the CMS 140. The management server 210 may also manage internal services 250 to support simultaneous monitoring of instances within internal services 250, within a cloud 110, and within a virtual cloud 220. According to some embodiments, a CMC 150B may be associated with an ME 130. Such an ME 130 may used the CMC 150B to subscribe to the CMS 140 in order to obtain management information about itself. Such information at the ME 130 about itself may support determining health or status as part of a self test. The information may also support failover or various scheduling decisions.

The POPs 120, 120A, and 120B may be referred to collectively, or in general, as POPs 120. The POPs 120 may be web service endpoints that monitor MEs 130 on a continuous, or periodic, basis and posts the monitored information to the CMS 140. A POP 120 may be implemented as any entity that can collect management information and publish it to the CMS 140. According to some examples, the POP 120 may be an agent executing in association with one or more clients, a watcher service executing in association with a cloud service, a component executing in the context of a managed cloud application, an agent executing on a VM 230 within a virtual cloud 220, any other such entity, or any combination thereof.

A POP 120 may claim an identity to a CMS 140 as part of a registration process. The POP 120 may receive authorization based on those claims once authenticated. The POP 120 may also, as part of registration, declare its location, capabilities, and monitoring scope. The POP 120 may then be provided, by the CMS 140, with roles and scopes as to which specific MEs 130 the POP 120 should monitor and to what level and at what frequency. For example, the roles and scopes may specify monitoring frequency, aggregation, filtering, and publishing frequency for the POP 120. The POP 120 may publish to more than one CMS 140 at a time and under different roles and scopes.

The various clients discussed, such as CMC 150, CMC 150A, and CMC 150B may be referred to collectively, or in general, as CMCs 150. A CMC 150 may claim an identity to a CMS 140 as part of a registration process. The CMC 150 may receive authorization based on those claims once authenticated. The CMC 150 may also, as part of registration, declare a desired monitoring scope. The CMC 150 may periodically negotiate its subscription to monitoring information from the CMS 140. For example, the CMC 150 may negotiate to alter monitoring frequency, identity of POPs 120 or MEs 130, location of POPs 120, and other parameters of the monitoring information to which it subscribes.

The management server 210 may be a CMC 150A which can register with the CMS 140, subscribe to delivery of management information, negotiate the quality of service (QOS) of the subscriptions, and also specify regular, periodic, or on-demand delivery of monitored information. The management server 210 may combine the monitored information from the CMF 100 with monitored information from internal services 250 to provide a full, inside-out and outside-in view into services and applications of interest to the enterprise.

An example of an outside-in monitoring function may apply to a web site or web service hosted within the enterprise. A POP 120 located outside of the enterprise may be tasked with monitoring the web site or web service to determine the health or status of outside links connecting into the service. The information once collected at the external POP 120 may be published to the management server 210 back inside the enterprise. An example of an inside-out monitoring function may apply to determining the health of services hosted outside the enterprise from a POP 120 located within the enterprise. For example, if a cloud based service for validating credit card transactions for a specific type of credit card is not accessible, the published health status may allow a web server located within the enterprise to depopulate that specific type of credit card as a purchase option for online commerce. Once the validation service is restored, the respective payment option may be returned to the online commerce site.

It should be appreciated that the management server 210 may also be a CMC 150 and/or a POP 120. Operations associated with a CMC 150, a CMS 140, and a POP 120 may be distributed onto various and multiple entities, or assembled together in any combinations and multiplicities as may be meaningful to publish, consume, or centralize cloud monitoring activities. The functionality associated with a POP 120 or a CMC 150 may be provided as libraries or software development kits (SDK). These libraries or SDKs may support integrating the CMF 100 elements together or integrating them into other modules according to these various embodiments.

Figure 3:
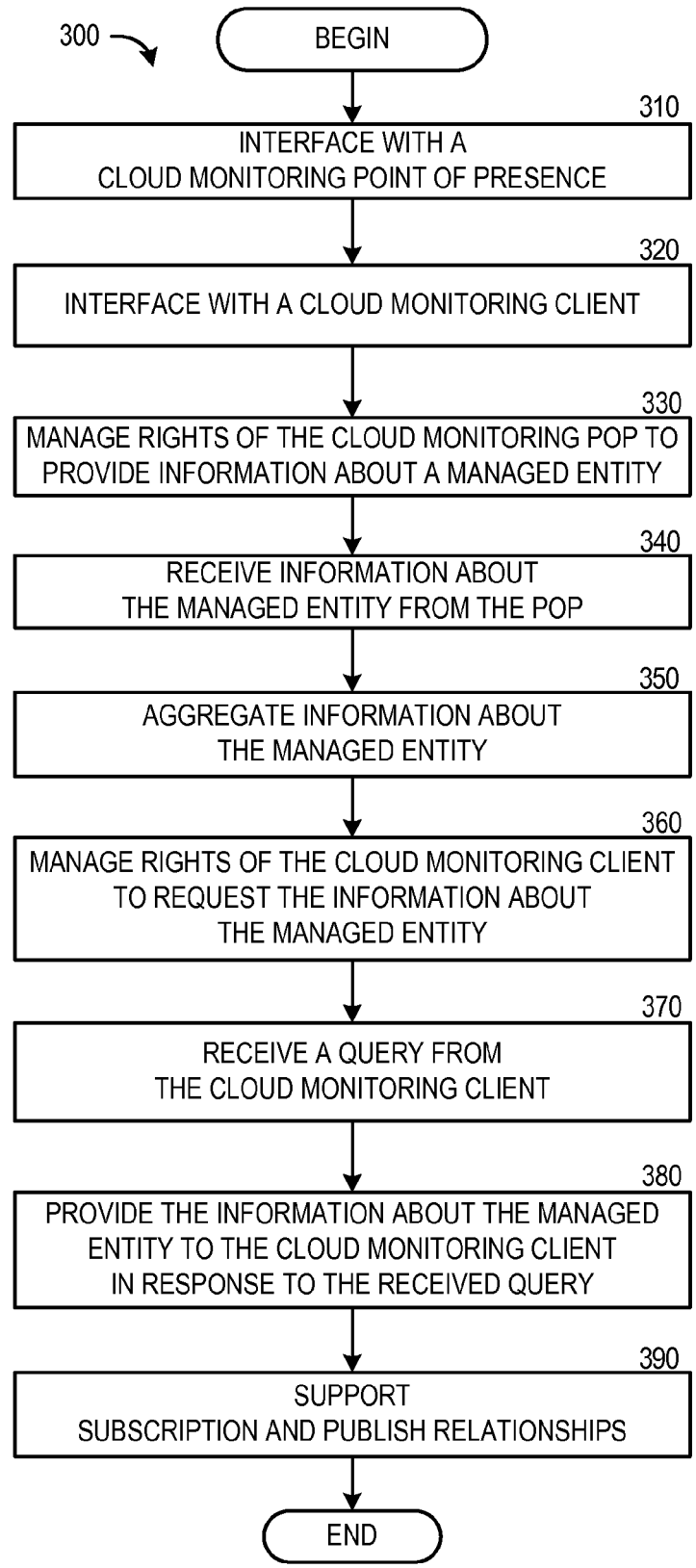
FIG. 3 is a flow diagram showing an illustrative process for a cloud monitoring service according to one or more embodiments presented herein.

Referring now to FIG. 3, additional details will be provided regarding the embodiments presented herein for cloud based service and application monitoring. In particular, FIG. 3 is a flow diagram illustrating a method 300 for a CMS 140 according to embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may be performed sequentially, in parallel, or in a different order than as described herein.

The method 300 begins at operation 310 where the CMS 140 interfaces with a POP 120. The CMS 140 may register the POP 120 using a claims based security policy. From operation 310, the method 300 proceeds to operation 320.

At operation 320, the CMS 140 may interface with a CMC 150. The CMS 140 may register the CMC 150 using a claims based security policy. From operation 320, the method 300 proceeds to operation 330.

At operation 330, the CMS 140 manages rights associated with the POP 120 to provide information about an ME 130. According to the claims based security policy established for the POP 120 at operation 310, the CMS 140 may specify which MEs 130 the POP 120 may publish monitoring information on. The CMS 140 may also specify various parameters related to the publishing. For example, monitoring frequency, publishing frequency, aggregation, processing, filtering, level of detail, and so forth. From operation 330, the method 300 proceeds to operation 340.

At operation 340, the CMS 140 receives information about the ME 130 from the POP 120. As the POP 120 collects management information related to the ME 130, that information may be published by the POP 120 to the CMS 140. The management information related to the ME 130 may include health status, performance metrics, operating statistics, and various other parameters. The CMS 140 may manage the throttling of published information from the POP 120. The CMS 140 may also manage the redundancy of published information from the POP 120 by monitoring and adjusting the scope of the POP 120. From operation 340, the method 300 proceeds to operation 350.

At operation 350, the CMS 140 aggregates the information about the ME 130. Aggregation of monitored management information may occur at the CMS 140, the POP 120, the CMC 150, or any combination thereof. The monitored management information related to the ME 130 may be stored in a cache, buffer, database, file system, any other data storage device, mechanism, or system, or any combination thereof. From operation 350, the method 300 proceeds to operation 360.

At operation 360, the CMS 140 manages the rights of the CMC 150 to request information about the ME 130. According to the claims based security policy established for the CMC 150 at operation 320, the CMC 150 may be able to access information related to specified MEs 130, a specified rates, and specified levels of detail. From operation 360, the method 300 proceeds to operation 370.

At operation 370, the CMS 140 receives a query from the CMC 150. The CMC 150 may query or subscribe to monitored management information from the CMS 140. This information may relate to the MEs 130 as the information is published to the CMS 140 from the POP 120. From operation 370, the method 300 proceeds to operation 380.

At operation 380, the CMS 140 provides the information about the ME 130 to the CMC 150 in response to the received query of operation 370 being related to the ME 130. From operation 380, the method 300 proceeds to operation 390.

At operation 390, the CMS 140 provides publication and subscription services with the POPs 120 and the CMCs 150. The method 300 may terminate after operation 390 or the method 300 may be repeated continuously or periodically.

Figure 4:
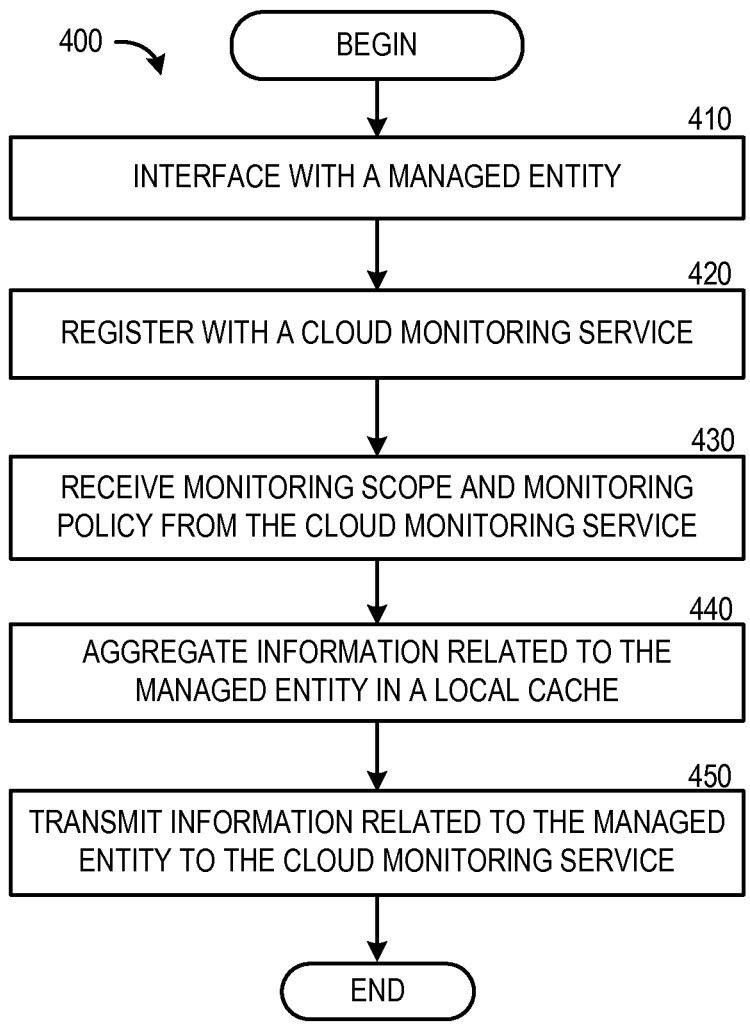
FIG. 4 is a flow diagram showing an illustrative process for a cloud monitoring point of presence according to one or more embodiments presented herein.

Referring now to FIG. 4, additional details will be provided regarding the embodiments presented herein for cloud based service and application monitoring. In particular, FIG. 4 is a flow diagram illustrating a method 400 for a cloud monitoring point of presence (POP) 120 according to embodiments presented herein. The method 400 begins at operation 410 where the POP 120 interfaces with an ME 130. For example, a network connection may be established between the POP 120 and the ME 130. Establishing this connection may include a discovery process to identify MEs 130 available for monitoring within access to the POP 120.

It should be appreciated that the POP 120 may not have direct network connectivity with the ME 130, as the POP 120 may obtain information about the ME 120 indirectly. Also, the ME 130 may not actively participate in the CMF 100. The CMF 100 may merely observe the ME 130. From operation 410, the method 400 proceeds to operation 420.

At operation 420, the POP 120 registers with a CMS 140. The POP 120 may register with the CMS 140 using a claims based security policy. According to such a policy, the POP 120 may make claims as to the identity, capabilities, or affiliations of the POP 120. The CMS 140 may attempt to authenticate the claims of the POP 120. The POP 120 may establish subscription and publication relationships with the CMS 140 as part of the registration process. From operation 420, the method 400 proceeds to operation 430.

At operation 430, the POP 120 receives monitoring roles, scopes, or policies from the CMS 140. For example, a scope may indicate to the POP 120 which MEs 130 it should monitor. Similarly, a policy may specify to the POP 120 various parameters such as monitoring frequency, processing, publishing frequency, aggregation, filtering, and so forth. From operation 430, the method 400 proceeds to operation 440.

At operation 440, the POP 120 aggregates information related to the ME 130 in a local cache. From operation 440, the method 400 proceeds to operation 450.

At operation 450, the POP 120 transmits, or publishes, to the CMS 140 any monitored management information related to the ME 130. The method 400 may terminate after operation 450 or the method 400 may be repeated continuously or periodically.

Figure 5:
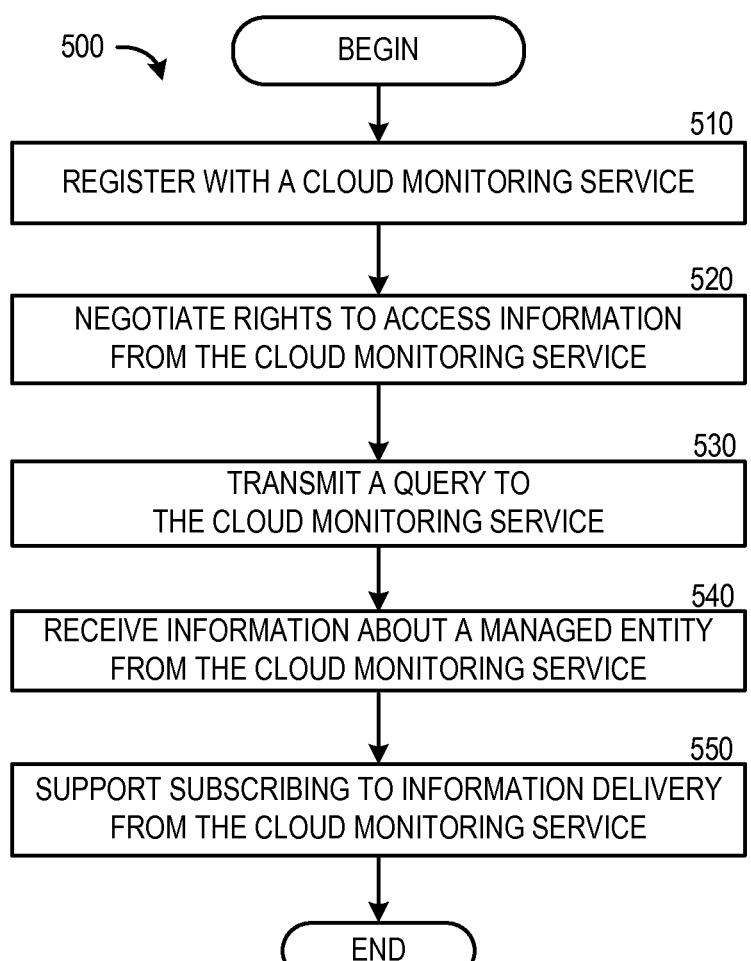
FIG. 5 is a flow diagram showing an illustrative process for a cloud monitoring client according to one or more embodiments presented herein.

Referring now to FIG. 5, additional details will be provided regarding the embodiments presented herein for cloud based service and application monitoring. In particular, FIG. 5 is a flow diagram illustrating a method 500 for a cloud monitoring client according to embodiments presented herein. The method 500 begins at operation 510 where the CMC 150 registers with a CMS 140. The CMC 150 may register with the CMS 140 using a claims based security policy. According to such a policy, the CMC 150 may make claims as to the identity, capabilities, or affiliations of the CMC 150. The CMS 140 may attempt to authenticate the claims of the CMC 150. The CMC 150 may establish subscription and publication relationships with the CMS 140 as part of the registration process. From operation 510, the method 500 proceeds to operation 520.

At operation 520, the CMC 150 negotiates rights to access information regarding MEs 130 from the CMS 140. The CMC 150 may also negotiate subscription policies such as monitoring frequency, number of POPs 120 monitored, location of POPs 120 monitored, and so forth. From operation 520, the method 500 proceeds to operation 530.

At operation 530, the CMC 150 transmits a query to the CMS 140. The CMC 150 may also provide a query scope specifying which MEs 130 the CMC 150 wishes to monitor. From operation 530, the method 500 proceeds to operation 540.

At operation 540, the CMC 150 receives information about an ME 130 from the CMS 140 in response to the query transmitted in operation 530. The CMC 150 can locally aggregate the received information. The CMC 150 may also share the received information with the management server 210 or other associated consumer of the received information. From operation 540, the method 500 proceeds to operation 550.

At operation 550, the CMC 150 provides subscription services for requesting information delivery from the CMS 140. The method 500 may terminate after operation 550 or the method 500 may be repeated continuously or periodically.

Figure 6:
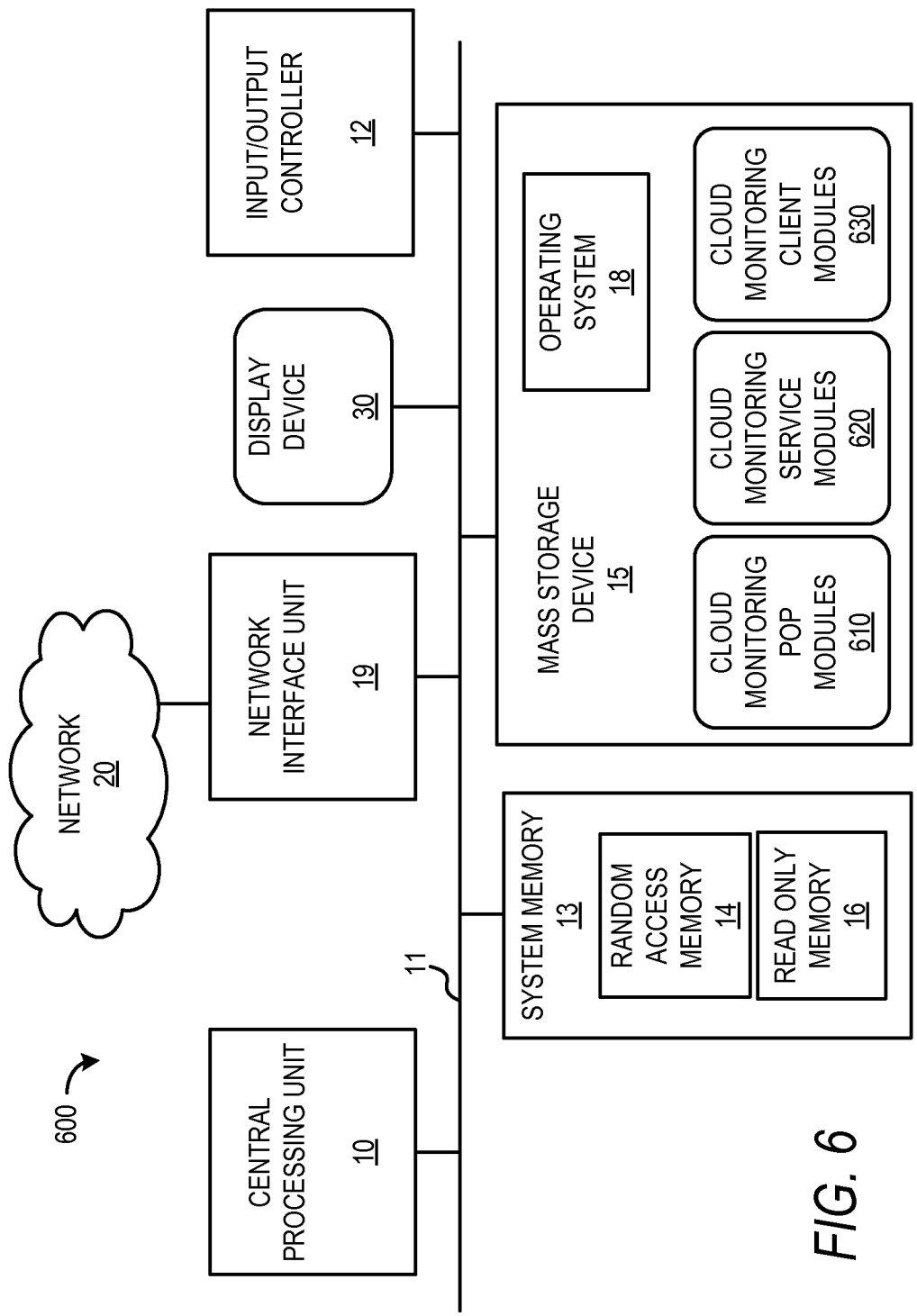
FIG. 6 is a computer architecture diagram showing an illustrative computer hardware architecture for a computing system capable of implementing embodiments presented herein.

Turning now to FIG. 6, an illustrative computer architecture 600 can execute software components described herein for cloud based service and application monitoring. The computer architecture shown in FIG. 6 illustrates a conventional desktop, laptop, or server computer and may be utilized to execute any aspects of the software components presented herein. It should be appreciated however, that the described software components can also be executed on other example computing environments, such as mobile devices, television, set-top boxes, kiosks, vehicular information systems, mobile telephones, embedded systems, or otherwise. The computer architecture 600 may apply to the computer serving as a cloud monitoring POP 120, a CMS 140, a CMC 150, or a management server 210. The computer architecture 600 may execute the program modules associated with cloud based service and application monitoring such as cloud monitoring POP modules 610, cloud monitoring service (CMS) modules 620, cloud monitoring client (CMC) modules 630, or any combination thereof.

The computer architecture illustrated in FIG. 6 can include a central processing unit 10 (CPU), a system memory 13, including a random access memory 14 (RAM) and a read-only memory 16 (ROM), and a system bus 11 that can couple the system memory 13 to the CPU 10. The system memory 13 may provide memory used for cloud based service and application monitoring. A basic input/output system containing the basic routines that help to transfer information between elements within the computer 600, such as during startup, can be stored in the ROM 16. The computer 600 may further include a mass storage device 15 for storing an operating system 18, software, data, and various program modules, such as those associated with cloud based service and application monitoring. The program modules may include cloud monitoring POP modules 610, cloud monitoring service (CMS) modules 620, or cloud monitoring client (CMC) modules 630.

The mass storage device 15 can be connected to the CPU 10 through a mass storage controller (not illustrated) connected to the bus 11. The mass storage device 15 and its associated computer-readable media can provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 20. The network 20 may overlap, in whole or in part, with the cloud 110 or the virtual cloud 220. The computer 600 may connect to the network 20 through a network interface unit 19 connected to the bus 11. It should be appreciated that the network interface unit 19 may also be utilized to connect to other types of networks and remote computer systems. The computer 600 may also include an input/output controller 12 for receiving and processing input from a number of other devices, including a keyboard, mouse, or electronic stylus (not illustrated). Similarly, an input/output controller 12 may provide output to, a printer, or other type of output device (also not illustrated). A display device 30 may be used for providing output from the computer 600 in the form of text, graphics, video, graphical user interface, any other user interface elements, or any combination thereof.

As mentioned briefly above, a number of program modules and data files may be stored in the mass storage device 15 and RAM 14 of the computer 600, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store the program modules associated with cloud based service and application monitoring for execution by the CPU 10. The mass storage device 15, the ROM 16, and the RAM 14 may also store other types of program modules.

In general, software applications or modules such as cloud monitoring POP modules 610, cloud monitoring service (CMS) modules 620, or cloud monitoring client (CMC) modules may, when loaded into the CPU 10 and executed, transform the CPU 10 and the overall computer 600 from general-purpose computing systems into special-purpose computing systems customized to perform cloud based service and application monitoring. The CPU 10 may be constructed from any number of transistors or other discrete circuit elements, which may individually or collectively assume any number of states. More specifically, the CPU 10 may operate as one or more finite-state machines, in response to executable instructions contained within the software or modules. These computer-executable instructions may transform the CPU 10 by specifying how the CPU 10 transitions between states, thereby physically transforming the transistors or other discrete hardware elements constituting the CPU 10.

Encoding the software or modules onto the mass storage device 15 may also transform the physical structure of the mass storage device 15 or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for cloud based service and application monitoring are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An optical disk, a magnetic disk storage device, or a solid state storage device having computer-executable instructions stored thereon which, when executed by a computer, cause the computer to
    register, with a cloud monitoring service acting as a central subscription and publication service, a cloud monitoring client as a subscriber to management information associated with one or more managed entities, the cloud monitoring client executing within an enterprise network;
    receive access rights to management information associated with at least one of one or more managed entities, the one or more managed entities comprising services or applications executing outside the enterprise network wherein:
        the management information has been published to the cloud monitoring service by a cloud monitoring point of presence executing outside the enterprise network, the cloud monitoring point of presence being registered with the cloud monitoring service as a publisher of the management information associated with the one or more managed entities,
        the management information comprises at least one of health metrics, performance metrics, or statistics about the one or more managed entities, and
        the cloud monitoring point of presence is not directly accessible by the cloud monitoring client;
    transmit a query from the cloud monitoring client to the cloud monitoring service to access the management information associated with the at least one of the one or more managed entities; and
    receive, from the cloud monitoring service and in response to the query from the cloud monitoring client, the management information associated with the at least one of the one or more managed entities.

2. The optical disk, magnetic disk storage device, or solid state storage device of claim 1, wherein the query specifies a scope of the one or more managed entities for which to provide management information.

3. The optical disk, magnetic disk storage device, or solid state storage device of claim 1, having further computer-executable instructions stored thereon to negotiate a monitoring policy with the cloud monitoring service.

4. The optical disk, magnetic disk storage device, or solid state storage device of claim 3, wherein the monitoring policy comprises a filtering specification.

5. The optical disk, magnetic disk storage device, or solid state storage device of claim 1, having further computer-executable instructions stored thereon to aggregate the management information associated with the at least one of the one or more managed entities.

6. The optical disk, magnetic disk storage device, or solid state storage device of claim 1, wherein registering the cloud monitoring client comprises registering according to a claim based security policy, whereby the cloud monitoring client submits one or more claims as to an identity, a capability, or an affiliation of the cloud monitoring client.

7. The optical disk, magnetic disk storage device, or solid state storage device of claim 1, having further computer-executable instructions stored thereon to provide the received management information associated with the at least one of the one or more managed entities to a management server.

8. The optical disk, magnetic disk storage device, or solid state storage device of claim 1, having further computer-executable instructions stored thereon to aggregate the received management information associated with the at least one of the one or more managed entities with information about one or more internal services of a management server.

9. A computer-implemented method for monitoring cloud based services, the method comprising computer-implemented operations for:
    registering, with a cloud monitoring service acting as a central subscription and publication service, a cloud monitoring client as a subscriber to management information associated with one or more managed entities, the cloud monitoring client executing within an enterprise network;
    receiving access rights to management information collected at the cloud monitoring service, the management information comprising at least one of health metrics, performance metrics, or statistics about one or more managed entities, each of the managed entities comprising a service or an application, the management information provided to the cloud monitoring service by a plurality of cloud monitoring points of presence executing outside the enterprise network that monitor and aggregate information published from the one or more managed entities, and each of the plurality of cloud monitoring points of presence have been registered with the cloud monitoring service as a publisher of the management information, wherein the plurality of cloud monitoring points of presence are not directly accessible by the cloud monitoring client;
    transmitting a query from the cloud monitoring client to the cloud monitoring service to access the management information associated with the one or more managed entities; and
    receiving, from the cloud monitoring service and in response to the query from the cloud monitoring client, the management information associated with the one or more managed entities.

10. The computer-implemented method of claim 9, wherein the query specifies a scope of the one or more managed entities for which to provide management information.

11. The computer-implemented method of claim 9, further comprising negotiating a monitoring policy with the cloud monitoring service.

12. The computer-implemented method of claim 11, wherein the monitoring policy comprises a filtering specification.

13. The computer-implemented method of claim 9, further comprising aggregating the management information associated with the at least one of the one or more managed entities.

14. The computer-implemented method of claim 9, wherein registering the cloud monitoring client comprises registering according to a claim based security policy, whereby the cloud monitoring client submits one or more claims as to an identity, a capability, or an affiliation of the cloud monitoring client.

15. The computer-implemented method of claim 9, further comprising providing the received management information associated with the at least one of the one or more managed entities to a management server.

16. The computer-implemented method of claim 9, further comprising aggregating the received management information associated with the at least one of the one or more managed entities with information about internal services of a management server.

17. A computer, comprising:
a processor; and
a computer-readable storage medium in communication with the processor, the computer-readable storage medium comprising computer-executable instructions stored thereon which, when executed by the processor, cause the processor to
register, with a cloud monitoring service acting as a central subscription and publication services, a cloud monitoring client as a subscriber to management information associated with one or more managed entities, the cloud monitoring client executing within an enterprise network;
receive access rights to management information associated with at least one of one or more managed entities, the one or more managed entities comprising services executing outside the enterprise network, wherein the management information is provided by a plurality of cloud monitoring points of presence registered with the cloud monitoring service and not directly accessible by the cloud monitoring client;
transmit a query from the cloud monitoring client to the cloud monitoring service to access the management information associated with the at least one of the one or more managed entities; and
receive, from the cloud monitoring service and in response to the query from the cloud monitoring client, the management information associated with the at least one of the one or more managed entities.

18. The computer of claim 17, wherein to register, the cloud monitoring client submits one or more claims as to an identity, a capability, or an affiliation of the cloud monitoring client, and the cloud monitoring service authenticates the cloud monitoring client or the plurality of cloud monitoring points of presence based on the one or more claims.

19. The computer of claim 17, wherein the computer-executable instructions, when executed by the processor, cause the processor to negotiate a monitoring policy with the cloud monitoring service.

20. The computer of claim 17, wherein the computer-executable instructions, when executed by the processor, cause the processor to aggregate the received management information associated with the at least one of the one or more managed entities with information about internal services of a management server.

* * * * *